March 22, 1938.  C. G. QUICK ET AL  2,111,728
DELIVERY MECHANISM FOR USE IN DELIVERING THE PRODUCTS
OF PRINTING MACHINES IN COUNTED BATCHES
Filed Aug. 14, 1934  2 Sheets-Sheet 1
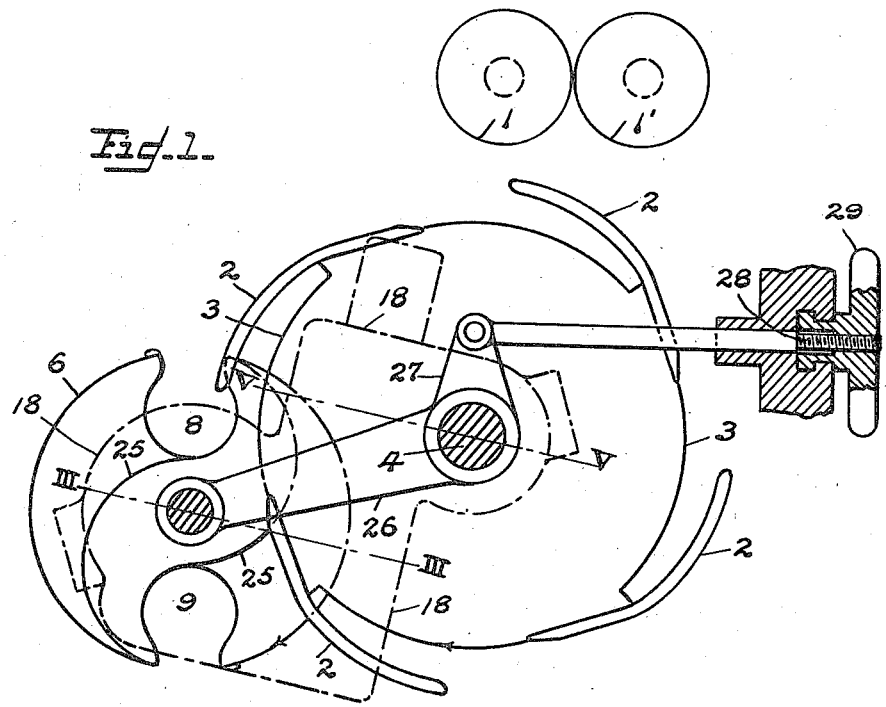
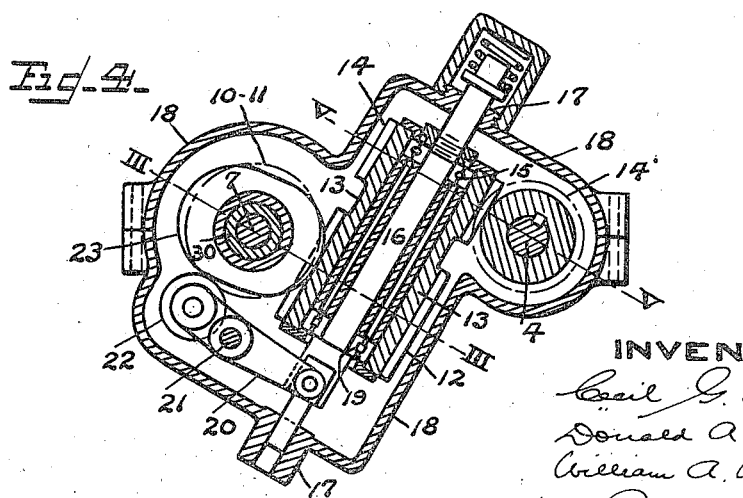
INVENTORS.

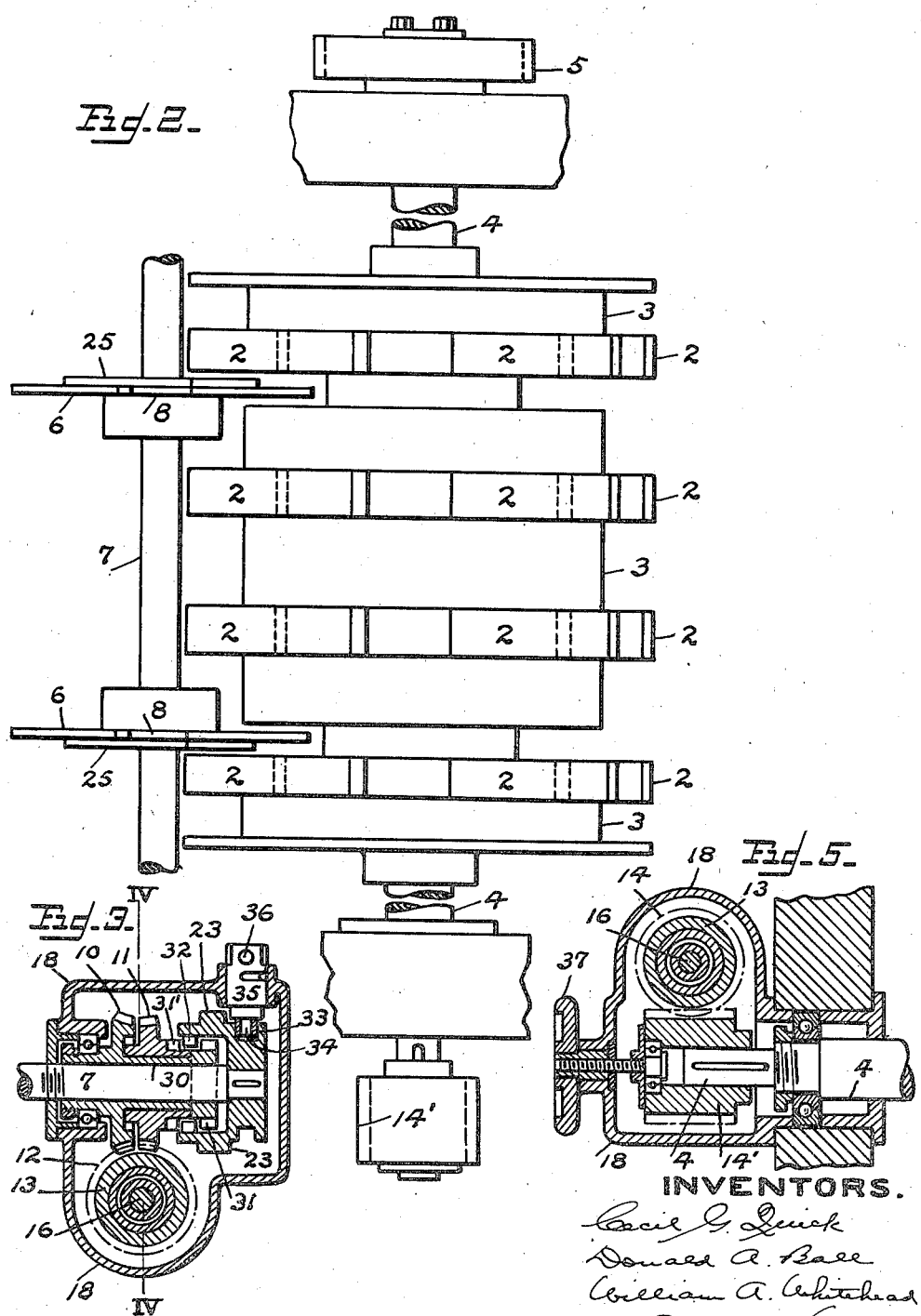

Patented Mar. 22, 1938

2,111,728

UNITED STATES PATENT OFFICE 2,111,728

DELIVERY MECHANISM FOR USE IN DELIVERING THE PRODUCTS OF PRINTING MACHINES IN COUNTED BATCHES

Cecil George Quick, Donald Arthur Ball, and William Arnold Whitehead, London, England, assignors, by mesne assignments, to R. Hoe & Co., Inc., New York, N. Y., a corporation of New York Application August 14, 1934, Serial No. 739,750 In Great Britain August 16, 1933

18 Claims. (Cl. 93—93)

This invention relates to improvements in delivery mechanism for use in delivering the products of printing machines in counted batches and is more particularly concerned with what are known as "fly" delivery devices in which there is provided a rotatable member having thereon arms which form pockets to receive the products of the machine at one point in the rotation of the member and from which the products pass to a conveyor belt or the like at another point in the rotation, the belt being located below the fly.

The invention relates to that arrangement of this class of apparatus in which the arms when on the delivery side move in the same general direction as that of the conveyor belt. With this arrangement counting of the copies has been effected by causing certain copies to be angularly or laterally displaced with respect to the other copies, these angularly or laterally displaced copies constituting the count copies and serving to indicate a counted bundle. Such counting mechanism is however, unsatisfactory in practice and the main object of the present invention is to provide, in this arrangement of delivery mechanism, means whereby a count can be effected by causing the count copies to be displaced in the direction of run of the copies constituting the products of the machine.

In one way of carrying out the present invention there is provided an abutment member which causes the copies to fall or be ejected from the fly on to the conveyor and which is provided with two operating surfaces one for causing the copies of a count to fall from the fly at one predetermined point in the rotation of the fly and the other of which is moved quickly into operative position to cause the count copies to fall from the fly at a later time in the rotation of the fly; these latter copies will, by reason of this delayed fall overlie the preceding copies to some extent and will lie forwardly of the succeeding copies and thereby indicate the copies constituting the count.

The invention is illustrated in the accompanying drawings in which Figure 1 is a side elevation showing a fly delivery, Figure 2 a plan view of Figure 1, Figures 3-5 detail views, Figure 3 being a section on the line III—III Figures 1 and 4, Figure 4 a section on the line IV—IV Figure 3, and Figure 5 a section on the line V—V Figures 1 and 4.

1, 1' are rollers through which the products of a printing machine pass to a fly comprising arms 2 secured to hubs 3 on a shaft 4 driven in the direction of the arrow in Figure 1 through a gear wheel 5 from any convenient part of the machine, the arms 2 and hubs 3 providing a plurality of pockets into which the products pass. There are also provided two abutment members in the form of discs 6 secured to a shaft 7, the discs each having therein two recesses or pockets 8, 9 at diametrically opposite points, the bottom of each pocket constituting one of two abutment surfaces the other of which is formed by the periphery of the disc 6, which periphery is concentric with the shaft 7 and is engaged by the products whereby they are released from the fly and delivered in evenly spaced distribution upon the belts or conveyor chains 24. The discs 6 are arranged to extend between the arms 2 of the fly so that the copies are carried round by the fly until they meet either the bottoms of the pockets or the periphery of the discs depending upon the position of the discs. The disc shaft 7 has worm wheels 10, 11 in mesh with a worm 12 fast on a diagonal tubular shaft 13 having a second worm wheel 14 in mesh with a worm 14' on the shaft 4 of the fly, one or other of the worm wheels 10, 11 being made fast with the disc shaft 7 in the manner hereinafter described.

The tubular shaft 13 is supported through bearings 15 from a central spindle 16 which is slidably mounted at each end in bearings 17 formed in a casing member 18, relative axial movement between the spindle 16 and the tubular shaft 13 being prevented by the provision of a bearing 19 designed to take end thrust. The spindle 16 is engaged by one arm of a lever 20 pivotally mounted between its ends on a fixed pivot 21 and is provided at its other end with a roller 22 in engagement with a cam 23 on the disc shaft 7. This cam 23 causes the lever 20 to oscillate, i. e. to swing backwards and forwards once per half revolution of the disc shaft and these movements of the lever 20 are transmitted to the spindle 16 which together with the worm 12 and worm wheel 14 on the tubular shaft 13 is thus caused to reciprocate. The tubular shaft 13 thus receives two components of rotation, one a component of constant speed due to the constant rotation of the fly shaft 4 and the other an alternating component due to the axial movement of the worm wheel 14 relatively to the worm 14' on the fly shaft 4 and of the worm 12 relatively to the worm wheels 10, 11 on the disc shaft 7, it being understood that the helix angles of the teeth on the worm 14' and worm wheel 14 permit this reverse action to occur.

The arrangement is such that the resultant rotation imparted to the disc shaft 7 is firstly one of rapid acceleration to present the pockets say 8 of each disc 6 to receive a count copy and to move the pockets clear of the succeeding copy, and then one of deceleration at which time the succeeding copies engage the periphery of the discs 6 after which the cam 23 causes the second pockets say 9 of the discs 6 to be quickly presented to the next count copy and so on.

The count copies, which are received within the pockets are obviously allowed to travel further with the fly than are those engaged by the periphery of the discs 6 and thus the count copies are allowed to fall from the pockets 8, 9 on to conveyor chains 24 or the like located below the discs 6 so as to overlie the preceding copies and to lie ahead of succeeding copies. It will be apparent that the discs and the pockets therein will be engaged by the copies at points which are displaced along the copies so that the count copies and the copies of the batches will be in line with each other, as distinct from the count copies being angularly or laterally displaced relatively to the copies of the batch.

In order to enable the depth of the pockets 8, 9 to be varied to vary the additional travel of the count copies, the depth to the bottom walls of the pockets can be regulated by opposite parts of hook shaped members 25 which can be adjusted about the disc shaft 7, the position of the members determining the effective depth of the pockets due to the eccentrically disposed operative edges thereof. If these members be formed in two separate parts, one or other of the pockets can be completely closed for use when the fly is delivering "collated" products in which case the copies will be delivered at one half the rate of uncollated products: closure of one of the pockets enables the same count to be obtained with collated copies as with uncollated copies since there will be only one pocket presented for each revolution of the discs 6.

In order to enable the position of the discs 6 to be adjusted circumferentially of the fly, the shaft 7 and also the drive gearing therefor and including the casing member 18 are mounted to oscillate about the axis of the fly shaft 4, the parts referred to being for this purpose carried by arms 26 (only one of which is shown) which are freely mounted on the fly shaft and the arms 26 being provided with extensions 27 engaged by adjusting rods 28 having screw threaded ends engaged by screw threaded adjusting hand wheels 29. The threaded rods 28 for each arm 26 may be arranged for independent operation or they may be interconnected so that a single hand wheel 29 effects operation of both rods simultaneously.

The provision of the two worm wheels, 10, 11 enables a variation of the number of copies in the count to be effected in the following manner: the two worm wheels 10, 11 have a slightly different number of teeth for example, a difference of one tooth, and one worm wheel 10 is fast on a sleeve 30 rotatable on the shaft 7 and the other worm wheel 11 is mounted to rotate on the sleeve 30: the sleeve 30 and the second worm wheel 11 are provided with dog clutch teeth 31 and 31' respectively and there is provided a sliding dog clutch member 32 which is secured to the disc shaft 7 which latter is free to move axially. The dog clutch member 32 is formed with an annular groove into which extends a roller 33 on a pin 34 carried eccentrically on a clutch operating rod 35 journalled in the casing 18 and provided with an operating handle 36 the arrangement being such that the frictional drag exerted between the roller 33 and the clutch member 32 maintains the member in one or other extreme position. In one position the clutch member 32 connects the sleeve 30 to the disc shaft 7 and in the other it connects the second worm wheel 11 to the disc shaft 7, thus providing a variation in the speed of rotation of this shaft 7 relatively to the fly shaft 4 and thereby effecting a variation in the time intervals between the taking of the count copies.

An initial adjustment of the position of the pockets 8, 9 of the discs 6 relatively to the fly arms 2, is provided by arranging the worm 14' on the fly shaft 4 to be free to slide axially thereon but prevented from rotational movement with respect thereto, and by providing a hand wheel 37 by means of which the worm 14' can be slid on the shaft 4: this movement of the worm causes the worm wheel 14 in mesh with it to rotate and thus the disc shaft 7 can be given a lead or a lag with respect to the fly shaft.

It will be understood from the above that by the use of the improved delivery mechanism of this invention, folded products from printing machines may be efficiently and expeditiously delivered in counted batches or bundles with one copy of each displaced to indicate the extent of the counted batch. It will be noted that the folded matter is delivered to the conveyor belts with the folded edges of one copy disposed on top of the preceding copy, slightly to the rear of the folded edge thereof, and in advance of the covered free edges of the copy beneath the same. Due to this arrangement, the folded edge of the count indicating copy, advanced beyond the normal position of the other copies by the mechanism described, facilitates the removal of the batches from the belt, the folded edges of all being visible and readily grasped and the batches separated where indicated, without possible inconvenience of loose or free edges interfering.

It will also be understood that whereas it is preferable to have the count indicating copy advanced in parallel movement as described, angular disposition may readily be had when desired. A simple adjustment of member 25 on one of the discs 6, to close openings 8 and 9 thereof, will cause the count indicating copy to assume an angular position in respect to the others. This angular position may be at any angle and at either side, depending upon the amount of opening permitted, and which disc 6, is selected.

While a preferred embodiment of this invention is shown and described, it will be understood that it is not to be limited to all of the details shown, but is capable of modification and variation within the spirit of the invention and scope of the appended claims.

What we claim is:

1. Delivery mechanism comprising a rotatable fly, a conveyer device which while receiving copies from the fly moves in the same general direction as the delivery side of the fly, an abutment member having two abutment surfaces up to which the copies are carried by the fly, a first surface causing copies engaged by it to fall from the fly at an earlier time in the rotation of the fly than copies engaging the second surface, and means operating the abutment member first to present the said first surface to a succession of copies and then the said second surface which allows the copy engaging the said other surface to overlie the preceding copies and thus to indicate the extent of the batch constituted by the said succession of copies.

2. In a delivery mechanism, means for forwarding products, a rotatable fly to receive the products, and rotary means having an arcuate periphery concentric to its axis forming an abutment for a plurality of the products carried by the said fly, to release them therefrom in even distribution upon a receiving member and having a portion of its peripheral surface formed to present a recess to delay release of a single predetermined product from said fly and to cause it to be disposed upon the receiving member unevenly with respect to the distribution of the others disposed thereon.

3. In a delivery mechanism, means for forwarding folded products, a rotatable fly to receive the products, a moving support below said fly to receive the products therefrom, and rotary means having an arcuate peripheral surface concentric to its axis disposed to be engaged by each of a series of the products to release them from said fly and to dispose them in evenly spaced relation upon said moving support, said rotary means having a portion of its peripheral surface formed to present a recess to be engaged by one of a series of products and to cause it to be disposed upon said support other than in the aforesaid evenly spaced relation.

4. A delivery mechanism comprising a rotatable fly, a conveyer device moving in the same general direction as the delivery side of said fly, and rotary abutment means engageable by products carried by said fly to release the same therefrom and to dispose them on said conveyer, said rotary abutment means being adapted to cause predetermined individual products to be disposed on said conveyer at a later time in respect to the rotation of said fly than the other products.

5. In a delivery mechanism, a rotatable fly, a conveyer device, a rotary abutment, said rotary abutment having a surface adapted to be engaged by the products carried by said fly to release them therefrom and dispose them upon said conveyer device, and having another surface to be engaged by one of the products at a later point in the rotation of said fly than are the other products, means to rotate said abutment to alternately present said surfaces for such engagement, and means to cause the speed of rotation of said abutment to differ during alternate engagement of products.

6. In a delivery mechanism, a rotatable fly, a conveyer device, a rotary abutment, said abutment having a surface forming part of its periphery and disposed to be engaged by a series of the products carried by said fly to release them therefrom and dispose them upon said conveyer and having another product engaging surface forming another part of its periphery and adapted to be engaged by one of the series of products at a later point in the rotation of said fly, and means to rotate said abutment at different speeds to present one of said surfaces for a longer period than the other.

7. In a delivery mechanism, a rotatable fly, a conveyer device, a rotary abutment, said abutment having a surface forming part of its periphery disposed to be engaged by a series of the products carried by said fly to release them therefrom and dispose them upon said conveyer substantially in evenly overlapped distribution, means including another surface portion of the periphery of said abutment to be engaged by one of the series of products and to dispose it on said conveyer overlapping the adjacent product a greater amount than the amount of overlap of the others, means to rotate said abutment to alternately present said surfaces for such engagement, and means to alternately vary the speed of rotation of said abutment.

8. In a delivery mechanism, a rotatable fly, a rotatable abutment member disposed to be engaged by products carried by said fly and comprising a disc-like member having its circumference interrupted by a cut-away portion to form a pocket having substantially abrupt sides, and means to rotate said member to present the uncut portion thereof for engagement by a series of products and then to present the pocket formed by the cut-away portion for engagement therein by one of the products.

9. In a delivery mechanism, a rotatable fly, a rotatable abutment member disposed to be engaged by products carried by said fly and comprising a disc-like member having its circumference interrupted by a cut-away portion to form a pocket, and means to rotate said member at a relatively slow speed while presenting the uncut portion thereof for engagement by a series of products and including means to rotate said member at a faster speed while presenting the pocket formed by the cut-away portion.

10. In a delivery mechanism, a rotatable fly, a rotatable abutment member disposed to be engaged by products carried by said fly and comprising a disc-like member having its circumference interrupted by a cut-away portion to form a pocket, means to rotate said member to present the uncut portion thereof for engagement by a series of products and then to present the pocket formed by the cut-away portion for engagement therein by one of the products, and means to vary the depth of the pocket formed by said cut-away portion.

11. In a delivery mechanism, a rotary fly, a rotatable disc disposed to be engaged by products carried by said fly, to release the same therefrom, said disc having upon its periphery a plurality of product engaging surfaces, including a surface recessed radially below another and means to vary the radial depth of the recessed surface.

12. In a delivery mechanism, a rotary fly, a rotatable disc disposed to be engaged by products carried by said fly to release the same therefrom, said disc having upon its periphery a plurality of product engaging surfaces movable with the disc past said fly, and one being radially offset from another, and means to rotate said disc at different speeds during the passage of the different surfaces past said fly.

13. In a delivery mechanism, a rotary member adapted to receive and carry products, a rotatable disc having the greater portion of its periphery concentric to its axis and being disposed to be engaged by the products carried by said member to remove the same therefrom, said disc also having a pocket formed in its periphery, and means to vary the depth of the pocket.

14. In a delivery mechanism, a rotary member having means on its periphery to carry products, a rotatable disc positioned to be engaged by and to remove products from said member and deposit them in evenly spaced sequence, a portion of said disc being recessed to form a surface to be engaged by and to deposit one of a series of products unevenly spaced from the others, and means to mount said disc for circumferential adjustment about said member to vary the product removing action thereof.

15. In a delivery mechanism, a rotary member having means on its periphery to carry products, a rotatable disc positioned to be engaged by, and to remove products from, said member and deposit them in evenly spaced sequence, and means to mount said disc for circumferential adjustment about said member to vary the product removing action thereof.

16. In a delivery mechanism, a rotatable fly, a rotatable abutment member disposed to have its peripheral surface engaged by products carried by said fly, said abutment member having a portion of its peripheral surface concentric to its axis and a portion recessed, and means to rotate the abutment member at a relatively slow speed while a series of products are being engaged by the concentric surface portion thereof and including means to increase the rotative speed of the abutment member to position the recessed surface portion thereof in the path of a product presented thereto by the fly.

17. In a delivery mechanism, a rotatable fly, a rotatable abutment member disposed to have its peripheral surface engaged by products carried by said fly, said abutment member having a portion of its peripheral surface concentric to its axis and a portion recessed, means to rotate the abutment member at a relatively slow speed while a series of products are being engaged by the concentric surface portion thereof and including means to increase the rotative speed of the abutment member to position the recessed surface portion thereof in the path of a product presented thereto by the fly, and means to mount the abutment member and its rotating means for adjustment circumferentially of said fly.

18. In a delivery mechanism, a rotatable fly, a rotatable abutment member disposed to have its peripheral surface engaged by products carried by said fly, said abutment member having a portion of its peripheral surface concentric to its axis and a portion recessed, means to rotate the abutment member at a relatively slow speed while a series of products are being engaged by the concentric surface portion thereof and including means to increase the rotative speed of the abutment member to position the recessed surface portion thereof in the path of a product presented thereto by the fly, means to mount the abutment member and its rotating means for adjustment circumferentially of said fly, means to rotate the fly, and means drivingly connecting the rotating means for the abutment member to the fly rotating means.

CECIL GEORGE QUICK.
DONALD ARTHUR BALL.
WILLIAM ARNOLD WHITEHEAD.